June 12, 1934.   A. N. SHOLKIN   1,962,467
METHOD OF AND MEANS FOR SIGNALING
Original Filed Dec. 23, 1930   3 Sheets-Sheet 1

INVENTOR
ARCADY N. SHOLKIN
BY
ATTORNEY

June 12, 1934. A. N. SHOLKIN 1,962,467
METHOD OF AND MEANS FOR SIGNALING
Original Filed Dec. 23, 1930 3 Sheets-Sheet 2

INVENTOR
ARCADY N. SHOLKIN
BY
ATTORNEY

June 12, 1934.    A. N. SHOLKIN    1,962,467
METHOD OF AND MEANS FOR SIGNALING
Original Filed Dec. 23, 1930    3 Sheets-Sheet 3

INVENTOR
ARCADY N. SHOLKIN
BY
ATTORNEY

Patented June 12, 1934

1,962,467

UNITED STATES PATENT OFFICE 1,962,467

METHOD OF AND MEANS FOR SIGNALING

Arcady N. Sholkin, Manila, P. I., assignor to Radio Corporation of America, a corporation of Delaware Application December 23, 1930, Serial No. 504,436
Renewed February 27, 1933

19 Claims. (Cl. 178—3)

This invention relates to signal translating apparatus and in particular to a new method of and means for converting signal indications into electrical energy in the form of impulses representative of the signals converted.

More in detail this invention relates to means for converting signal indications on a tape into potential variations of signal characteristic duration automatically without the use of any mechanical relays or moving parts. The signal impulses may then be used in a novel manner to key an oscillation frequency generator which is in turn connected to a radiating system or the signals may be repeated and sent directly over a line to a distant point to be again converted into legible signals.

Automatic translating apparatus for converting marking on the tape into electrical energy has been known heretofore in the art. These devices, as for example the Creed automatic transmitters or the Wheatstone transmitters, automatically translate signal perforations on a tape into electrical impulses. All of the automatic means of this nature known heretofore make use of mechanical feelers or relays for converting the signal perforations in the tape into electrical energy, which may be amplified and transmitted over a land line. Transmitters of this nature, known heretofore, can only be used to convert perforations in a tape into energy impulses.

One of the objects of the present invention is to provide a transmitter that may convert automatically without the use of any moving parts, as for example feelers or relays, signal markings of any known kind, either shading on the tape or markings comprising perforations in the tapes into signal impulses characteristic of the marking.

Another object of the present invention is to provide signal translating apparatus of the above nature by means of which signals may be converted into current impulses at a higher rate of speed than possible heretofore.

Another object of the above invention is to provide signal translating means which will at a high speed and automatically convert signal markings of any nature whatever on the tape into current impulses, the duration of which and the constancy of which may be predetermined by a novel means incorporated in the translating means.

Briefly and broadly, the above objects are attained by passing the tape on which the signals to be converted are impressed or marked between one or more light responsive cells and one or more sources of light whereby the resistance of the cells is varied in accordance with the signal markings and connecting said cell or cells in the input circuit of a thermionic tube or tubes having in the output circuit thereof means for determining the constancy of the potential impulses repeated in the output circuit and for utilizing said impulses to key a transmitter or to control the output circuit of repeaters which may be connected to a radiating system or to a transmission line.

In one form of the invention the output circuit of the thermionic tube includes inductances through which the current impulses flow and by means of which the impulses may be utilized to key the transmitter or to actuate repeaters connected with a transmission line.

A further modification provides means for insuring that the marking potentials will remain constant for a duration sufficiently to clearly and accurately indicate the character of the signal converted. This feature is desirable for high speed work to properly distinguish between dots and dashes or for any signal transmission wherein it is imperative that the impulses be sustained for a length of time closely representative of the length of the signal marking to be translated, and also where the potentials control directly the generation of signals by a transmitter.

An added feature of the invention is the converting chamber or unit through which the marked tape is passed and in which the source or sources of light, the cell or cells and the mirror or mirrors necessary to direct the light after it is passed through the tape to the cell are located. This unit also includes means for pulling the tape through the chamber and means for insuring that the tape is clean and free of markings other than the signal markings before it enters the chamber.

Each of the signal translating and converting means described briefly above may be actuated manually in cases where it is desired to send out signals which are not on a tape. A novel means for keying the repeater in which manual means for determining the resistance of the cells has been provided, as will appear in detail hereinafter.

What I consider the novel features of my invention will be set forth precisely in the claims appended to the specification. The construction of the invention and the mode of operation thereof will be better understood by the following description thereof and therefrom and when read with the attached drawings throughout which like reference numerals indicate like parts and in which;

Figures 5 and 6 show modifications of the arrangement of Figure 4; while,

The apparatus as arranged in accordance with the present invention can be roughly divided up into three units, the first of which is the converter chamber and includes the means for changing the tape markings into electrical representations, the second being repeating amplifying means actuated in accordance with the electrical representations and third the means associated therewith for utilizing the repeated representations. These units will now be described in the order given above.

Figure 1:
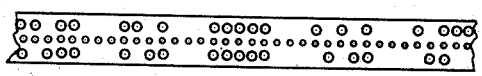
Figure 1 shows by way of example a tape having signal markings thereon.
Figure 3:
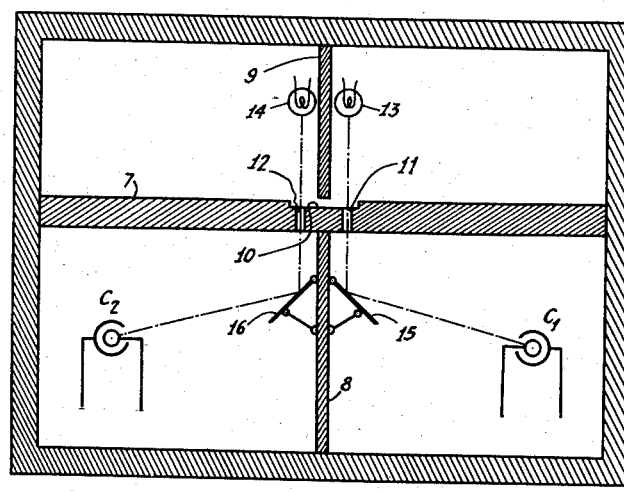
Figure 3 is a cross section through the chamber, showing merely for purposes of illustration the positioning of the lamps, mirrors, and cells therein.

Referring to the drawings, and in particular to Figure 1, the signals to be converted are indicated on a tape in any manner as, for instance, dark and light contrasts or by perforations therein obtained in a well known manner. For purposes of illustration, a tape punched on a standard perforator is shown in Figure 1. On this tape the lower holes are taken for purposes of illustration as being the marking holes and the upper holes are taken for the same purposes as the spacing holes. The spacing holes are advanced with respect to the marking holes for a reason which will appear more in detail hereinafter. The middle line of holes, as is known, are used to pull the tape through the keying apparatus or in this case through the photoelectric automatic translater or converter. This tape, on which the size of the marking and the spacing holes is reduced in accordance with the present invention, is pulled, as will be seen by referring to Figures 3 and 4 through a guideway in converter chamber 4 by means of a sprocket wheel 3 driven in any manner at the proper speed. In order that the tape may be free of dirt or any other markings other than the signal markings, where desired, a pair of brushes (not shown) may be located adjacent the tape where it enters the converter chamber 4. The chamber 4 houses the apparatus necessary to convert the tape markings into variations in resistance in an electrical circuit. The converter chamber and the apparatus therein will now be described.

The converter chamber 4 (see Figure 4) comprises a closure member, the interior of which is divided into four sections, each of which is closed with respect to the others in such a manner that light originating in one section cannot reach another section. This division is accomplished by providing a horizontal member 7 dividing the chamber into upper and lower sections. The lower section is divided as indicated into two completely separated chambers by a member 8. The upper section is further divided into two compartments which are substantially isolated from each other by a member 9 which extends to a point just clearing the tape (not shown in Figure 3) which is passed in a guide 10 in the member 7 as will appear more in detail hereinafter.

Figure 2:
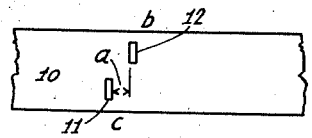
Figure 2 shows a plan view of the guide over which the tape is passed and the light slits in the said guide.

Guide 10 has therein (see Figure 2) narrow slots 11 and 12 over which the marking and spacing holes in the tape pass. For purposes of illustration assume the marking holes pass over slot 11 and the spacing holes over slot 12. A pair of light sources 13 and 14 respectively are mounted on opposite sides of the division member 9 of the chamber 4 in such a manner as to throw light downwardly towards the tape and towards the pair of mirrors 15 and 16 respectively located on opposite sides of a division member 8 in the chamber 4. The division member 9 reaches almost to the tape in such a manner that light from the source 13 cannot reach the tape on the other side of the division member 9, while light from the source 14 cannot reach the portion of the chamber in which the source 13 is located. The division member 8 abuts or is made integral with the member 7 so that light passed to the mirror on one side of the division member 8 will not reach the mirror on the other side of the division member 15. A pair of light sensitive cells $C_1$ and $C_2$ are located in the chamber in such a manner that light reflected from the mirrors 15 and 16 will strike the cells $C_1$ and $C_2$ respectively. The mirrors 15 and 16 are made adjustable so that the light may be directed towards the proper point on the cells.

Up to this point applicant has shown a novel and efficient means for converting markings on a tape into light, the intensity of which varies in accordance with variations in the markings on the tape and for causing the controlled light to strike a light responsive cell. Applicant will now describe the repeater and its relation to the cells.

Figure 4:
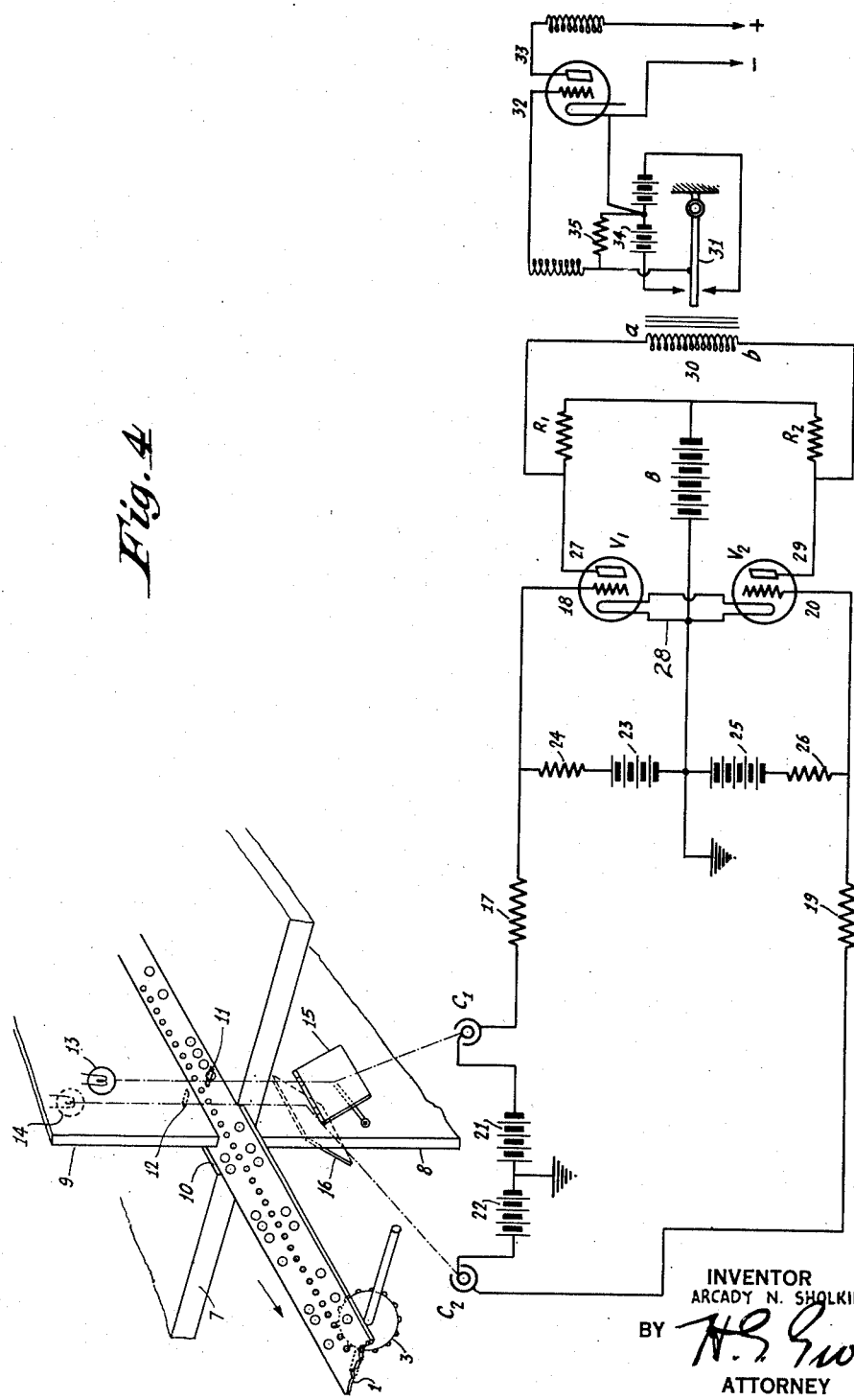
Figure 4 shows a translating device and transmitter arranged in accordance with the present invention.

$C_1$ has a terminal connected through a resistance 17 to the control electrode 18 of thermionic tube $V_1$, while the corresponding electrode of $C_2$ is connected through a resistance 19 to the control electrode 20 of a thermionic repeater $V_2$ as shown in Figure 4. The other electrodes of $C_1$ and $C_2$ are each connected to a positive terminal of batteries 21 and 22 respectively. The negative terminals of batteries 21 and 22 are connected together and to ground.

Biasing potential for the control grid of $V_1$ is supplied from a battery 23 through a resistance 24, while biasing potential is supplied to the grid 20 of $V_2$ through a resistance 26 from a battery 25. The potential normally applied to the grids of $V_1$ and $V_2$ is such as to render said tubes nonconducting as will appear in detail hereinafter. The anode electrode 27 of $V_1$ is connected through a resistance $R_1$ and a source of potential B to the cathode 28 of $V_1$, while the anode 29 of $V_2$ is connected through a resistance $R_2$ and the source B to the cathode 28 of $V_2$. An inductance 30 is connected between anode 27 of $V_1$ and anode 29 of $V_2$. Current flowing through this inductance, which forms part of a keying relay, actuates the armature 31 of the relay in such a manner pointed out more in detail hereinafter as to connect the grid 32 of an oscillation generator 33 to the positive terminal of a battery 34 when a marking hole or indication on the tape passes over the slot 11 so that the generator 33 generates oscillations which are transmitted, for a time the duration of which is characteristic of the marking indication, while the armature 31 connects the negative terminal of battery 34 to the control electrode of 33 when a spacing hole or indication on the tape passes over the slot 12 in the guide, thereby stopping oscillation of the tube 33, for a time the duration of which is characteristic of a space. A high resistance 35 prevents keying shocks which would result from complete opening of the control electrode cathode circuit of 33.

In operation the tape 1 is pulled by means of 3 through the chamber 4. The tape passes through the guideway 2 bringing the markings on the tape between the sources of light 13 and 14 and their respective slits in the guideway.

Figure 5:
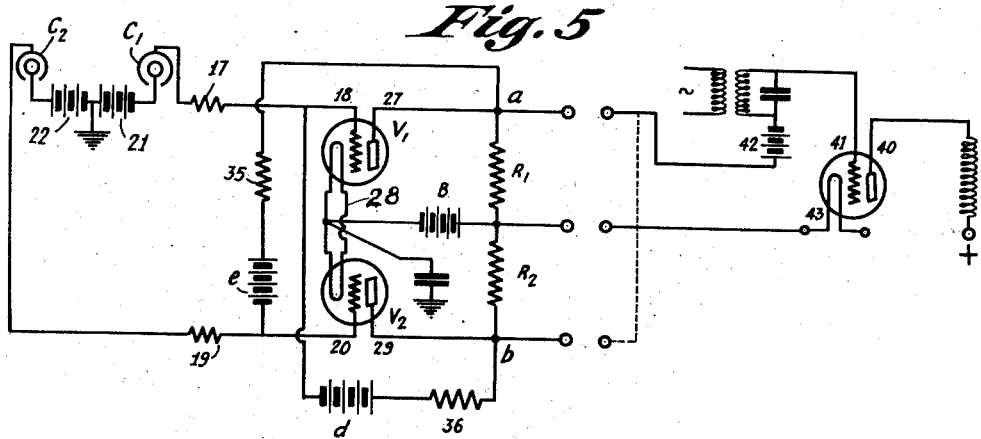
Figure 6:
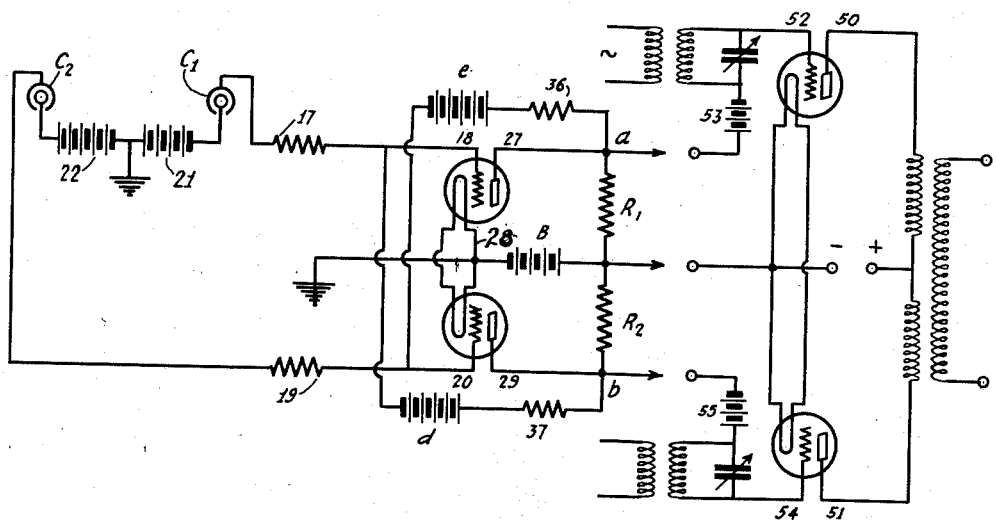

When the blank tape is passing over the slots 11 and 12 the light reaching the cells $C_1$ and $C_2$ respectively from the lamps 13 and 14 is too weak to lower the resistance of the cells $C_1$ and $C_2$ sufficiently to allow the voltage applied from batteries 21 and 22 to the grids 18 and 20 respectively of $V_1$, $V_2$ to rise to a potential which will allow them to pass current. These tubes are, as will be seen by an inspection of Figure 5, maintained non-conducting by means of the negative potential applied to the control electrodes therein by batteries 23, 25 respectively through resistances 24, 26 respectively. Consequently no current will appear in the winding 30. If a hole on the lower side of the tape, that is the right hand or marking side of the tape, passes over the opening 11 in the guide, a ray of light will pass from the source 13 to mirror 15 and from the mirror which is adjustable to the selected sensitive point on cell $C_1$. This will make the cell $C_1$ conducting and battery 21 will apply a positive potential to the control electrode 18 of $V_1$. This potential will overcome the negative potential applied to 18 from 23 and will render the tube $V_1$ conducting and current will flow in the output circuit thereof. This current may be used to actuate a keying relay, as indicated in Figure 5, or to directly change the bias on the grid of a transmitting tube, as indicated in Figure 6.

After proper interval determined by the distance the marking holes on the tape are advanced from the space hole, a dash will reach the spacing slot 12 and light will be thrown on the cell $C_2$. This cell will become conductive and the potential on grid 20 will rise. The tube $V_2$ becomes conductive and current will flow through $V_2$ and appear flowing in an opposite direction than before in the winding 30. This will actuate the relay 31 in the opposite direction. Subsequent markings on the tape will energize the windings in the output circuits of the repeaters $V_1$ and $V_2$ in a similar manner.

More in detail the action which takes place in the output circuits of $V_1$ and $V_2$ as the tape is passed through the guide is as follows:

When $C_1$ is lighted due to the marking hole in the tape being over the marking slot in the guideway the resistance of this cell is reduced making the grid 18 positive thereby allowing tube $V_1$ to pass current. This action is repeated in the tube and current flows in the output circuit thereof. This anode cathode current goes from the terminal of battery B and then dividing part flows through the resistance $R_1$ and the other part flows through $R_2$ and winding 30 of the polarized relay from $b$ to $a$ putting the armature 31 of the relay on the marking side. From the photo cell the grid of the $V_1$ receives only positive impulses so the current through the relay is an impulse also, but the relay being polarized will hold the armature on the marking side till another positive impulse resulting from the action of a spacing hole on $C_2$ puts a positive potential on the grid of $V_2$ when the spacing hole is over the slot thereby causing current to flow in a reverse direction through the winding 30 putting the armature 31 of the polarized relay on the spacing side. This current will flow from battery B and then dividing part flows through resistor $R_2$ and another part through $R_1$ and winding 30 in a direction from points $a$ to $b$.

It will be understood that the reversal of flow of current in 30 may be utilized in any known manner without departing from the spirit of the present invention and that amplifiers may be interposed between the repeaters $V_1$ and $V_2$ and the utilization circuit without departing from the scope of the invention.

In order to key the transmitter by changing the bias on the tube it is necessary to have a potential rise that will hold its value for a period equal in length to the length of the dash or dot to be sent.

The arrangement illustrated in Figure 5 gives the required potential rise which will hold its value constant the required time even if the impulse on the grid of the tube be removed. This arrangement is broadly similar to the arrangement of Figure 4. It differs therefrom in that the winding 30 is removed from the output circuits of $V_1$ and $V_2$ while the biasing batteries 23 and 25 are removed from the input elements thereof.

In order to prolong the potential appearing in the anode of $V_1$ and $V_2$ for a time after the cells $C_1$ and $C_2$ cease to be conducting, a resistance 35 and source of potential $e$ is connected as shown between the anode 27 of $V_1$ and the control electrode 20 of $V_2$ while a resistance 36 and potential source $d$ are connected as shown between the anode 29 of $V_2$ and control electrode 18 of $V_1$.

When the grid 18 of the tube $V_1$ is made positive through the action of marking cell $C_1$ the tube becomes conducting and current flows through the tube. This current gives a certain voltage drop across the resistor $R_1$. A point of $R_1$ is connected through the resistor 35 and battery $e$ to the grid 20 of $V_2$. The values of the battery $e$ and the resistor 35 are adjusted so that with a predetermined voltage drop across the resistance $R_1$, caused by the current flowing when the cell $C_1$ is conducting, the grid 20 of the $V_2$ goes sufficiently negative to almost stop current from flowing through the tube $V_2$. The consequence of this is that the voltage drop across $R_2$ decreases. The point $b$ is connected from $R_2$ through the resistor 36 and battery $d$ to the grid 18 of the tube $V_1$, and the values of resistor 36 and battery $d$ are so adjusted that with the mentioned decrease in voltage drop across the resistor $R_2$ sufficient positive bias is applied to the grid 18 of the tube $V_1$ to take the place of the positive impulse received from the $C_1$ which has terminated. This positive bias on 18 will hold the current through the tube $V_1$ at the same value even if the impulse received through by the grid of $V_1$ was instantaneous. This will result in a constant potential at $a$ which may be used in a manner described hereinafter. When a spacing hole on the tape passes over 12 and $C_2$ and the grid 20 of the $V_2$ is made positive a reverse operation will take place. The voltage drop across the resistance $R_2$ will increase and that across the resistance $R_1$ will decrease. A positive bias will be applied to the grid 20 of $V_2$ from a through resistance 36 and battery $e$. This will result in a prolonged positive potential appearing on the anode of 20 and at the point $b$ of the anode circuit thereof.

I have now pointed out in detail a novel means whereby the potential obtained, in response to the change of light intensity on light responsive cells on the anodes of the repeaters associated therewith, can be maintained constant for a time after the cells have become nonconducting due to the fact that the light directed theretowards has been cut off. This constant potential may be utilized in many ways. For example, these current impulses of constant potential may be utilized to control a marking relay. The signal markings resulting from the use of a relay actuated by applicant's novel repeater will be square in form and will accurately represent the signals converted. This is an especially desirable feature when signaling is carried on by the Morse code.

Another manner in which the current impulses of constant amplitude may be utilized is to actuate the input circuit of amplifiers, the output circuits of which are connected with land lines over which the signals are to be transmitted.

Furthermore, the current impulses of constant potential and of predetermined duration may be utilized to control the input circuit of a transmitting generator as shown for purposes of illustration in Figures 5 and 6 of the drawings.

In Figure 5 a thermionic oscillation generator 40 has its control electrode 41 adapted to be connected as shown through a battery 42 to the point $a$ on resistance $R_1$. The filament 43 of oscillation generator 40 is adapted to be connected to the tap between $R_1$ and $R_2$. Voltage oscillations at the desired frequency may be impressed on the tuned grid cathode circuit of 40 from a source not shown. The value of battery 42 is such as to normally apply to the control grid 41 of 40, a potential which is sufficiently negative as to prevent a flow of current between the elements of 40. Since no current is flowing the tube 40 will not generate oscillations. When an impulse appears on the grid 18 of thermionic tube $V_1$, due to the action of light on marking cell $C_1$, the potential on anode 27 rises. The value of 42 is such that the positive potential applied from the anode 27 overcomes the negative potential of 42 and applied to the control electrode 41 of 40 a positive potential sufficient in value to cause 41 to oscillate freely. 40 in this manner generates oscillations determined by the nature of the circuits $e$, 35, and $d$, 36, of $V_1$ and $V_2$ respectively. The duration of these periods may be for a period truly representative of the signal markings on the tape or may be distorted in the manner which gives the desired results. The signal impulse may be utilized in any manner by connecting a work circuit, as for instance, an antenna circuit to the anode cathode circuit of 40. In this application of the invention the only purpose of the tube $V_2$ is to insure symmetry and to provide potentials obtained by the drop through $R_2$ in a manner described in detail hereinbefore, which may be applied through 36 and $d$ to control the electrode 18 to insure a constant potential at 27 for the desired time duration.

Although applicant has shown the transmitter as being connected to the repeaters $V_1$ and $V_2$ in a manner to utilize the drop across $R_1$ to control the oscillations generated thereby, it will be readily understood that the oscillation generator 40 may have its control electrode connected as indicated by dotted lines to the point $b$ on resistance $R_2$ so that the potential drop across the resistance $R_2$ will be utilized to control the generation of oscillations. This use is optional and depends upon whether or not it is preferable to have the marking cell predominantly control the operation of the transmitter or to have the spacing cell predominantly control the operation of the transmitter.

In the modification shown in Fig. 6 the oscillation generator comprises a pair of tubes 50 and 51. The tube 50 has its control grid 52 connected through a source of potential 53 to the point $a$ on resistance $R_1$. The thermionic tube 51 has its control grid 54 connected through a source of potential 55 to the point $b$ on $R_2$. High frequency oscillations may be impressed as shown on the capacity tuned input circuits of tubes 50 and 51. The cathode circuits of tubes 50 and 51 are both adapted to be connected to the midpoint of resistances $R_1$ and $R_2$. The anode circuits are connected together as shown for purposes of illustration so that a work circuit may be coupled therewith. As in the modification illustrated in Figure 5 the potentials of batteries 53 and 55 are chosen such that the control electrodes 52 and 54 are normally negative sufficiently to prevent the oscillation generators 50, 51 from operating. However, when a marking impulse is repeated in $V_1$ the positive potential at $a$ overcomes the negative potential at 53 sufficiently to apply to 52 a positive potential which will cause 50 to generate oscillations freely. After the marking indication on the tube has passed over the opening in the guideway and a spacing indication allows light to pass the cell $C_2$ a positive impulse appears, as pointed out above, at $b$ and overcomes the negative potential applied by 55 to 54 so that tube 51 generates oscillations for a time duration truly representative of the spacing marking on the tape.

It will be understood that although applicant has throughout the specification used a perforated tape in illustrating the invention and operation thereof, the invention contemplates the use of any known type of signal marked medium, as for instance a tape on which the signals are represented by light and dark contrasts.

Figure 7:
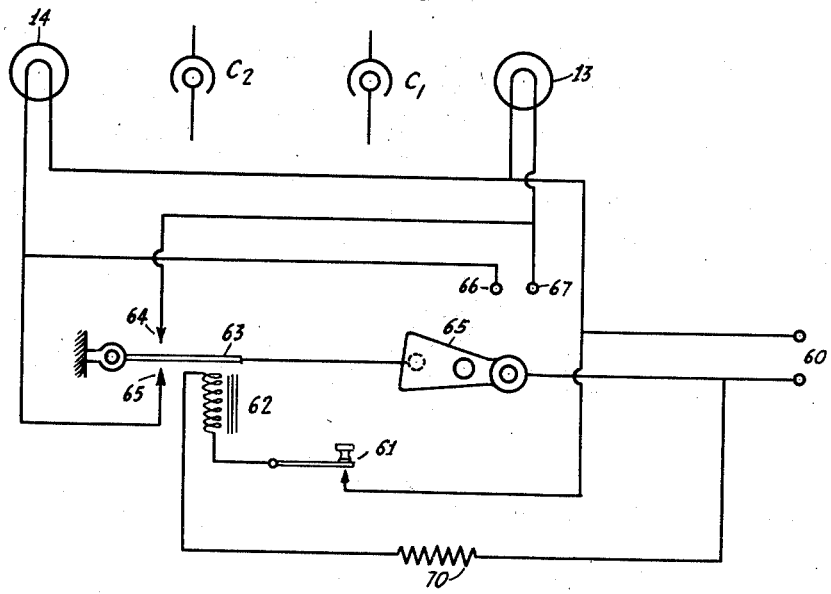
Figure 7 shows manual keying means which may be associated with either of the repeaters of Figures 5 and 6.

In case it is desired to manually control the repeaters shown in Figures 4, 5, and 6, an arrangement, as illustrated in Figure 7, is shown. In Figure 7 the light sources 13 and 14 are adapted to be connected or disconnected at will to an energy source 60 by means of a key 61 connected in the circuit of a keying relay 62 having an armature 63 cooperating with contacts 64 and 65 to close the energizing circuit through 13 or 14. When one of these circuits is closed one of the light sources will throw off light, the corresponding light cell will be energized, the resistance thereof will be lowered and current will flow in the input circuit of the appropriate tube $V_1$ or $V_2$ connected with said light cell. In order that both sources of light may be connected simultaneously to the source 60, a switch 65 is arranged to make contact with points 66 and 67 simultaneously. A resistance 70 prevents injury to the winding of relay 62 when the key 61 is closed.

Having thus described my invention and the operation thereof, what I claim is:

1. A translating device for converting signal markings on a tape or film into electrical impulses comprising a plurality of symmetrically arranged thermionic tubes each having a light cell in the input circuit thereof, a source of light for each cell, means for passing said tape between said source and said cells whereby light from said sources passes through said tape and toward said cell, means for directing said light on said cells, and means for preventing the light from a source from reaching more than one cell.

2. In transmission apparatus, the combination of means for converting signal markings on a tape into light rays characteristic of the signal markings, thermionic means having an input electrode energized by said light rays for producing electrical impulses the intensity of which is a function of the intensity of said light rays and an output electrode from which said impulses may be utilized, and means connected with said output electrode for determining the duration of said impulses.

3. In transmission apparatus, the combination of means for converting marking on a tape into light rays characteristic of the signal, means including a pair of thermionic repeaters and input and output circuits therefor for producing electrical impulses, the intensity of which is a function of intensity of said light rays, means in the output circuits of said repeaters for determining the duration of said impulses, and means connected with said output circuits and responsive to said impulses for generating voltage oscillations.

4. A thermionic repeater including a pair of thermionic tubes symmetrically arranged, a tapped impedance connecting the anodes of said tubes, means comprising light cells and a signal marked tape for impressing potential variations on the input electrodes of each tube whereby potential variations will appear on the output electrode thereof, and means for determining the duration of the potential variations in the output circuit of each of said tubes comprising a resistance and a source of potential connecting the anode of each of said tubes to the control electrode of the other of said tubes.

5. A thermionic repeater comprising a pair of thermionic tubes symmetrically arranged, a tapped impedance connecting the anodes of said tubes, means comprising light cells and a signal marked tape for impressing potential variations on the input electrodes of each tube whereby potential variations will appear on the output electrode thereof, and means for prolonging the duration of the potential variations in the output circuit of each of said tubes comprising a resistance and a source of potential connecting the anode of each of said tubes to the control electrode of the other of said tubes.

6. A thermionic repeater comprising a pair of thermionic tubes symmetrically arranged, a tapped impedance connecting the anodes of said tubes, light responsive means for impressing potential variations on the input electrodes of each tube whereby potential variations will appear on the output electrode thereof, and automatic means for distorting the potential variations in the output circuit of each of said tubes comprising a resistance and a source of potential connecting the anode of each of said tubes to the control electrode of the other of said tubes.

7. A thermionic repeater including a pair of thermionic tubes symmetrically arranged, a tapped impedance connecting the anodes of said tubes, light responsive means for impressing signal representative potential variations on the input electrodes of said tubes whereby potential variations will appear on the output electrodes thereof, and automatic means cooperating with said impedances to determine the duration of the potential variations on the output electrodes.

8. In means for converying signal markings on a tape into high frequency oscillations of the desired duration, the combination of means for converting said signal markings into light impulses, thermionic means for converting said light impulses into potential variations and a pair of thermionic oscillation generators the control circuits of which are responsive to said potential variations.

9. In signaling apparatus a pair of thermionic tubes symmetrically arranged, a tapped impedance connecting the anodes of said tubes, light responsive means for impressing potential variations on the input electrodes of each tube whereby potential variations will appear on the output electrodes thereof, automatic means for distorting the potential variations in the output circuit of each of said tubes comprising a resistance and a source of potential connecting the anode of each of said tubes to the control electrode of the other of said tubes, a thermionic oscillation generator having input and output circuits, and means for connecting the input circuit of said generator with the impedance in the output circuit of said thermionic tubes.

10. A device for producing electrical impulses the intensity of which are representative of signal markings on a tape comprising, a closure member having a plurality of substantially separated chambers, a light source in one of said chambers, there being an opening between said last named chamber and another of said chambers, said opening being in a guideway through which said tape may be passed and being of a diameter sufficient to permit light from said source to pass through one signal marking only on said tape, a light sensitive cell in the chamber to which light from said sources passes through said tape, means for directing the light which passes through said opening on to said cell, and a thermionic relay having its input elements connected with said light sensitive cell.

11. A device for producing electrical impulses the intensity of which is representative of signal markings on a tape comprising, a pair of light source chambers substantially completely separated by a partition, a tape guideway adjacent said partition, said guideway extending in each of said light source chambers so that a tape passed along said guideway will extend into both of said chambers, a pair of separate chambers in which light sensitive cells are mounted, there being openings in the guideway to permit light from each of said first named chambers to pass to one of said last named chambers, means in each of said last named chambers for directing light which passes through said openings from said sources to said cells, and a pair of thermionic relays symmetrically arranged, each of said relays having its input circuit connected with one of said light sensitive cells.

12. A translating device for converting signal markings on a tape or film into electrical impulses comprising a plurality of symmetrically arranged thermionic tubes each having a light cell in the input circuit thereof, a source of light for each cell, means for directing light from the source to the cell, and means for passing the message tape in the path of the light issuing from the source so that the light from the source which reaches the cell is controlled in accordance with the message indications upon the message tape, and means for preventing the light from a source from reaching more than one cell.

13. An energy translating device which comprises a plurality of light responsive elements, a light source to control each element, means to control sequentially the light reaching each light responsive element, means controlled in accordance with the illumination of the first of the light responsive elements for producing a predetermined substantially constant indication, and means responsive to illumination of the second of the light responsive elements for interrupting the continuity of the indications due to the first element.

14. An energy translating device which comprises a plurality of light sensitive elements, a light source to illuminate each element, means to control the light reaching each light sensitive element, means responsive to the output of the first of the light energized light responsive elements to produce a continuing signal of predetermined amplitude, and means responsive to the output energy of the second light responsive element due to the illumination thereof to interrupt the continuity of the signal due to the illumination of the first light responsive element.

15. An energy translating device which comprises a plurality of light sensitive elements, a light source for illuminating each element, means for sequentially interrupting the light reaching each element, means responsive to light upon one of the elements to produce a predetermined signal indication, and means responsive to light on the other light sensitive element to interrupt the produced signal indication.

16. An energy translating device which comprises a plurality of light sensitive elements, a light source for illuminating each element, means for sequentially interrupting the light reaching each element, means responsive to light upon one of the elements to produce a predetermined signal indication, and means responsive to light on the other light sensitive element to interrupt the produced signal indication, the interruption period continuing for the time period intervening between illumination of the second element and the next subsequent illumination of the first element.

17. In an energy translating device having a plurality of light sensitive control elements and a light source to control each element, the method of regulating the resulting output energy which comprises controlling sequentially the light reaching each of the light responsive elements, producing a predetermined substantially constant indication in accordance with the illumination of the first of the light responsive elements, and interrupting the continuity of the indication due to the illumination of the first element at time periods of illumination of the second of the light responsive elements.

18. In an energy translating device wherein the control action is produced by a plurality of light sensitive elements illuminated from independent light sources coordinated therewith, the method which includes the steps of sequentially interrupting the light reaching each light sensitive element, producing in accordance with the light upon one of the elements a predetermined response indication, interrupting the response indication at time periods of illumination of the other light sensitive element, and causing the interruption period to continue during the time period intervening between illumination of the second light sensitive element and the next subsequent illumination of the first light sensitive element.

19. In a translating device having a plurality of light-sensitive control elements each sensitive to independent incident light rays and adapted when energized to control an indicating device, the steps in the method of operation which comprise controlling the light reaching each light-sensitive element, producing continuing signal impulses of predetermined amplitude in accordance with the light incident upon one of the light-sensitive elements, energizing an indicating device by the produced signal, and producing a continuing signal impulse in accordance with the light incident upon the second light-sensitive element to de-energize the indicating device for a time period continuing until re-energization thereof is produced by a change in the light incident upon the first light-sensitive device.

ARCADY N. SHOLKIN.